United States Patent

[11] 3,601,022

[72] Inventor Kurt Langnau
 Dresden, Germany
[21] Appl. No. 781,481
[22] Filed Dec. 5, 1968
[45] Patented Aug. 24, 1971
[73] Assignee VEB Pentacon Dresden Kamera-und
 Kenowerke
 Dresden, Germany

[54] PHOTOGRAPHIC CAMERA
 4 Claims, 1 Drawing Fig.
[52] U.S. Cl............................................... 95/10 C,
 95/11 R, 95/42, 240/1.3
[51] Int. Cl........................................ G03b 7/08,
 G03b 15/05
[50] Field of Search........................................ 95/10 C,
 11, 11.5, 42, 53; 240/1.3

[56] References Cited
 UNITED STATES PATENTS
3,057,254 10/1962 Drury, Jr. .................... 95/10 (C) X 3,205,802 9/1965 Wareham..................... 95/11.5
3,288,044 11/1966 Bramer......................... 95/11.5
3,485,152 12/1969 Fuwa............................ 95/10 C Primary Examiner—Samuel S. Matthews
Assistant Examiner—Joseph F. Peters, Jr.
Attorney—Young & Thompson ABSTRACT: The photographic camera is provided with a flash apparatus which can be mounted on the camera housing or used at a remote position from the camera. The flash apparatus is provided with a photoelectric cell and a flash timing control device. The camera housing contains a photoelectric cell positioned in the optical path through the camera and normally used to control the shutter or diaphragm mechanism. An extension lead is provided for coupling the camera to the flash apparatus so that the photoelectric cell in the camera housing influences the control device of the flash apparatus whilst at the same time rendering the cell of the flash apparatus inoperative.

Patented Aug. 24, 1971  3,601,022
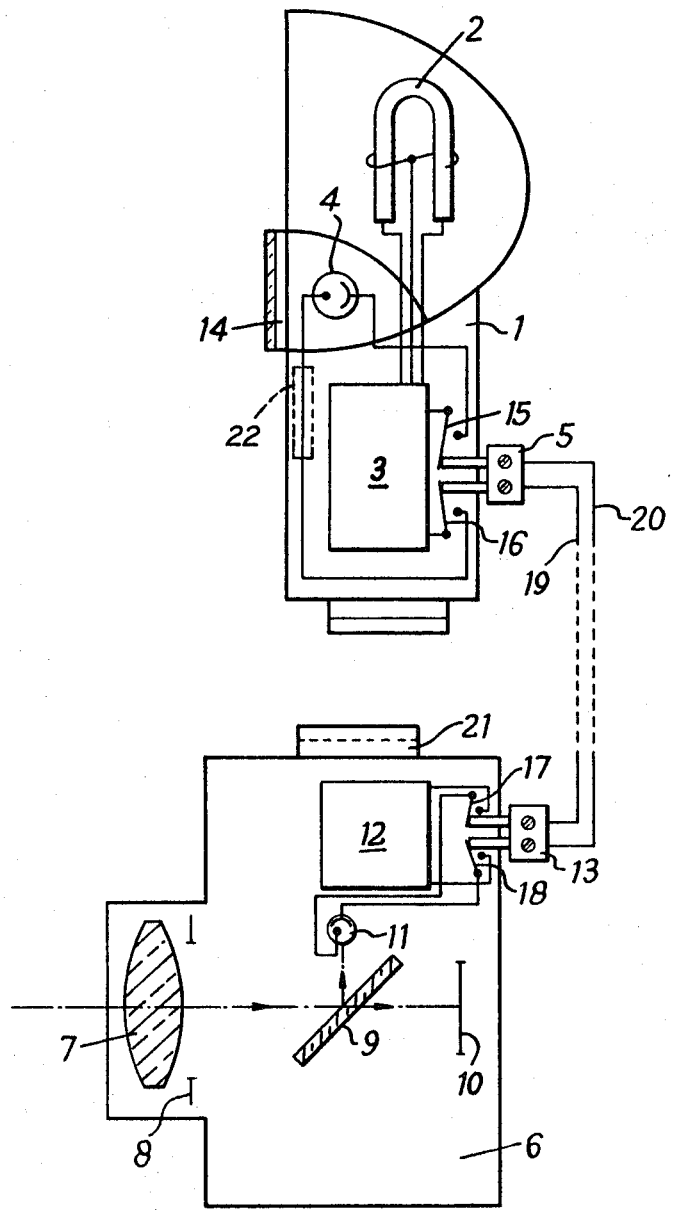
INVENTOR
KURT LANGNAU
By Young & Thompson
ATTYS.

PHOTOGRAPHIC CAMERA

BACKGROUND OF INVENTION

The invention relates to a photographic camera having flash apparatus with a photoelectric control device for determining the flash time a photoelectric cell being provided in the switching circuit of the control device.

In flash apparatus of this kind the inertialess photoelectric cell is rigidly mounted in the flash apparatus. This cell receives the light emitted by the flash apparatus and reflected against the cell by the subject, while the light reflected against the objective lens acts on the film. Particularly with flash apparatus constructed as manual apparatus freely movable in relation to the camera, differences occur in the direction of reflection as between the photoelectric cell of the flash apparatus, on the one hand, and the film to be illuminated in the camera, on the other. In this manner, the photoelectric cell built into the flash apparatus and the film inserted in the camera are subjected to different illumination, involving the danger of incorrect exposures for the film.

Cameras are also known which have a built-in control device for selecting the duration of the flash, the photoelectric cell being then positioned in the optical path of the light rays entering the objective lens. This arrangement ensures agreement between the reflection directions of the photoelectric cell on the one hand and the film to be exposed on the other. The installation of the complete control device, however, involves additional expenditure on the construction of the camera and thus an undesirable enlargement of its housing.

The purpose of the invention is to improve the measuring result of a control device built into the flash apparatus for the selection of the duration of the flash, and it is intended to achieve agreement between the illumination intensity to be communicated to the flash time formation device on the flash apparatus and the illumination intensity serving for the exposure of the film.

SUMMARY OF THE INVENTION

The invention enables the object to be achieved in that a photoelectric cell provided in the camera can be connected in an electrically conductive manner with the flash time control device built into the flash apparatus. As a result of this measure the direction of reflection encountering the photoelectric cell is adapted to the direction of reflection reaching the film, even when the flash apparatus is at a relatively great distance from the optical axis of the camera lens. It is advisable for a photoelectric cell to be provided both in the flash apparatus and in the camera and for each of these cells alternately to be connectable in an electrically conductive manner with the flash time control device for the flash apparatus can also be used in the usual manner, independently of a photoelectric cell in the camera itself.

In a special version of the invention, in order to adapt the image angle and the selected lens diaphragm accurately, the photoelectric cell in the camera is mounted, in a manner already known in itself, in the path of the light rays entering the camera through the objective lens.

The invention is explained in conjunction with an example illustrated and described in the accompanying drawing. The drawing is a part cross-sectional view in elevation of the camera and flash apparatus.

The flash apparatus 1 is provided with the discharge lamp 2 which is connected with a known flash time control device 3 for igniting it and for terminating the flash time. The photoelectric receiver used consists of the photoelectric cell 4. By the plug contact 5 this cell 4 can be disconnected, as a result of the switches 15 and 16, from the control device.

The camera 6 contains the rigidly mounted partly transmissive mirror 9 behind the lens 7, which is provided with a built-in diaphragm 8. The light penetrating the mirror passes to the film 10, while the light reflected from the mirror reaches a photoelectric cell 11. The cell 11 is connected with the switches 17 and 18, which normally connect the cell 11 to an exposure factor setting device 12. A plug contact 13 in insertable into the camera to connect the switches 17 and 18 with conductors 19 and 20, of an extension lead which are connected to the plug contact 5.

In front of the photoelectric cell 4 of the flash apparatus 1 is the filter 14, of which the degree of transmittance corresponds to the lens 7 and the partly transmissive mirror 9. The filter 14 is attached in such a way that it can be removed and replaced. The flash apparatus can be affixed to the shoe 21 of the camera 6.

The operation is already evident from the construction described. When photographs are taken with the flash apparatus the plug contact 5 is inserted in the flash apparatus 1 and the plug contact 13 in the camera 6. When the plug contact 5 is inserted the switches 15 and 16 are opened, so that the photoelectric cell 4 is disconnected from the control device 3 for the formation of the flash times. On the other hand, the conductors 19 and 20 are connected with the control device 3. When the plug contacts 13 are inserted the contacts 17 and 18 are contacted, as a result of which the photoelectric cell 11 is disconnected from the exposure factor setting device 12 and is connected with the conductors 19 and 20. The control device 3 of the flash apparatus 1 is now influenced by the photoelectric cell 11 provided in the camera 6.

Different versions from that described are naturally possible. If necessary the photoelectric cell in the camera itself can also be mounted outside the path of the objective rays on the front of the camera and in the immediate vicinity of the objective lens. Furthermore, it is conceivable for an electrical damping resistance 21 to be used for balancing out the difference in illumination between the use of the directly illuminated photoelectric cell 4 of the flash apparatus, on the one hand, and the use of the photoelectric cell 11 mounted in the attenuated path of the objective rays, on the other.

I claim:

1. In a photographic camera having a first photoelectric cell carried by the camera housing and associated with an exposure factor setting device within the housing, a flash apparatus which includes a flash time control device influenced by a second photoelectric cell an extension lead for connecting said flash apparatus with said camera housing, the provision of:
   a. a first changeover switch device in said camera housing which in one switched position connects said first photoelectric cell with said exposure factor setting device, and in a second position connects said first photoelectric cell with one end of said lead and
   b. a second switch device in said flash apparatus which in one switched position connects said second photoelectric cell with said flash time control device and in a second position connects said flash time control device with the other end of said lead.

2. A photographic camera according to claim 1, wherein plug contacts are provided at each end of said extension lead and the plug contacts when inserted in the camera and flash apparatus actuate the first and second changeover switch devices respectively, whereby the switches move to said second switch positions and connect said first photoelectric cell with said flash time control device through the extension lead.

3. A photographic camera according to claim 1, wherein an objective lens is provided in the camera and the said first photoelectric cell is positioned in the camera so as to be in the path of light rays that enters the camera through said objective lens, and a filter is provided in the flash apparatus, the said second photoelectric cell being equipped with said filter, whereby the degree of transmittance of illumination on to said second photoelectric cell corresponds to the degree of transmittance of illumination which influences the first photoelectric cell.

4. A photographic camera according to claim 1, wherein an objective lens is provided in the camera and the said first photoelectric cell is mounted in the path of light rays entering the objective lens, and a filter is provided in the flash apparatus, the said second photoelectric cell being equipped with said filter, whereby the degree of transmittance of illumination on to said second photoelectric cell corresponds to the degree of transmittance of illumination which influences the first photoelectric cell.